(12) United States Patent
Erlenmaier

(10) Patent No.: US 7,429,034 B2
(45) Date of Patent: Sep. 30, 2008

(54) APPARATUS AND METHOD FOR THERMAL CUTTING OF A WORKPIECE

(75) Inventor: Werner Erlenmaier, Gerlingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 67 days.

(21) Appl. No.: 11/159,108

(22) Filed: Jun. 23, 2005

(65) Prior Publication Data

US 2005/0236382 A1    Oct. 27, 2005

Related U.S. Application Data

(62) Division of application No. 10/366,714, filed on Feb. 14, 2003, now Pat. No. 6,956,183.

(30) Foreign Application Priority Data

Feb. 16, 2002    (EP)    .................. 02003419

(51) Int. Cl.
*B23K 26/08* (2006.01)
*B23K 37/04* (2006.01)

(52) U.S. Cl. ............ 269/54.5; 219/121.82; 219/121.67; 269/53; 72/420; 72/426

(58) Field of Classification Search .......... 269/53–54.5; 29/464; 219/121.67, 121.82, 121.72; 83/61; 72/290, 294, 338, 417, 420, 428, 426, 464

See application file for complete search history.

(56) References Cited

U.S. PATENT DOCUMENTS

| 154,694 A | | 9/1874 | Martin |
| 5,063,800 A | | 11/1991 | Jung et al. |
| 5,338,914 A | * | 8/1994 | Omote ................. 219/121.67 |
| 5,562,137 A | | 10/1996 | Brand |
| 5,585,015 A | * | 12/1996 | Hayashi et al. ........ 219/121.67 |
| 5,648,002 A | * | 7/1997 | Omote ................. 219/121.82 |
| 5,701,938 A | | 12/1997 | Brand |
| 5,889,675 A | * | 3/1999 | Minami et al. ............. 700/213 |
| 6,509,545 B1 | | 1/2003 | Klingel |

FOREIGN PATENT DOCUMENTS

| DE | 199 43 043 | | 3/2001 |
| JP | 62-275593 | | 11/1987 |
| JP | 62-292293 | | 12/1987 |
| JP | 01-113195 | | 5/1989 |
| JP | 05-237685 | | 2/1992 |
| JP | 05-269594 | | 10/1993 |
| JP | 06099296 A | * | 4/1994 |
| JP | 06106379 A | * | 4/1994 |

* cited by examiner

*Primary Examiner*—Dmitry Suhol
(74) *Attorney, Agent, or Firm*—Fish & Richardson P.C.

(57) ABSTRACT

An apparatus for thermal cutting of workpieces includes a cutting means for separating a workpiece into a finished part and a residual part, a workpiece support, and support elements for supporting the workpiece. Separate first and second support elements are provided for adjustable support of the finished part or the residual part and are disposed at a mutual separation in the region of the separating cut.

8 Claims, 1 Drawing Sheet

APPARATUS AND METHOD FOR THERMAL CUTTING OF A WORKPIECE

CLAIM OF PRIORITY

This application is a divisional of U.S. patent application No. 10/366,714, filed Feb. 14, 2003 now U.S. Pat. No. 6,956,183, entitled "Apparatus and Method of Thermal Cutting of a Workpiece," which claims priority under 35 USC §119(a) from European Patent Application No. 02003419.5, filed on Feb. 16, 2002. The entire contents of these applications are hereby incorporated by reference.

TECHNICAL FIELD

The invention relates to thermal cutting of a workpiece, and more particularly to a workpiece support with support elements for supporting the workpiece during thermal cutting.

BACKGROUND

Laser processing machines are known, for example, German Patent Number 19943043 A1.

Laser processing machines with two support levels for transporting a workpiece are described in JP 61-296988 and in JP 62-275593.

Until now, during thermal cutting of a workpieces, the workpieces to be processed have been disposed onto grids or grates of the workpiece support, resulting in a grid of support points. This causes the following problems: a kerf in the workpiece for separating the workpiece into a finished part and a residual part can be formed in the region of the support points. This may cause a caking of the two workpiece parts since in addition to the two workpiece parts, the support elements are also heated and welding can occur. Moreover, the center of mass of the two workpiece parts with regard to the support points may be unfavorable such that the workpiece parts are tilted on the workpiece support. These problems prevent an automated safe removal of the workpiece parts from the workpiece support.

SUMMARY

In a first general aspect, an apparatus for thermal cutting a workpiece includes a thermal cutting machine that in operation cuts the workpiece into a finished part and a residual part. A plurality of adjustable support elements support the finished part and the residual part. No support elements are located under the region of the workpiece whose temperature rises substantially when thermally cut.

Embodiments may include one or more of the following features. For example, the plurality of support elements may be displaceable. The plurality of adjustable support elements may include a plurality of first support elements forming a first support level for supporting the finished part and a plurality of second support elements forming a second support level for supporting the residual part. The first support elements may be adjustable in height, and the second support elements may be adjustable in height. A first matrix of first support elements may match an area of the finished part and a second matrix of second support elements may match an area of the residual part. A roller may be included at a tip of a support element. At least one of the support elements may include a hydraulically displaceable cylinder. At least one of the support elements includes a pneumatically displaceable cylinder. A programmable control unit may be included for positioning the support elements.

In a second general aspect, a method of thermally cutting a workpiece into a finished part and a residual part includes positioning the workpiece on a plurality of adjustable support elements, providing a first subset of support elements from the plurality of support elements for supporting the finished part, and providing a second subset of support elements from the plurality of support elements for supporting the residual part. The first subset of support elements is positioned to support the finished part, and the second subset of support elements is positioned to support the residual part. The workpiece is thermally cut into the finished part and the residual part by thermal cutting of the workpiece, but no support elements are located under the region of the workpiece whose temperature rises substantially when separated by the cutting means.

Embodiments may include one or more of the following features. For example, the first subset of support elements and the second set of support elements may be displaced away from the region of the workpiece whose temperature rises substantially when separated by the cutting means. The first subset of support elements may be positioned at a different vertical position than the second subset of support elements. A first matrix of support elements may be provided that matches an area of the finished part for supporting the finished part, and a second matrix of support elements may be provided that matches an area of the residual part for supporting the residual part. Positioning the first subset of support elements may include positioning the support elements with hydraulic pressure, or with pnuematic pressure. Positioning the second subset of support elements may include positioning the support elements with pnuematic pressure or with hydraulic pressure. A control signal may be sent from a programmable control unit to a support element to control the position of the support elements.

The details of one or more embodiments are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Figure 1:
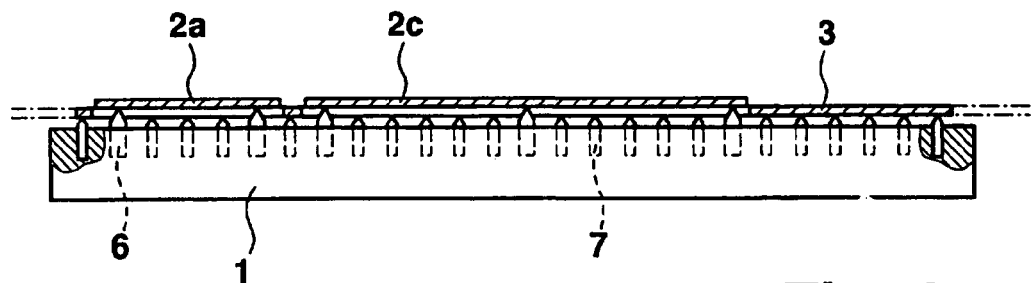
FIG. 1 is a longitudinal sectional view of a workpiece support of a laser cutting machine.

A workpiece (e.g., a sheet of sheet metal) is placed on a workpiece support and subsequently processed by a known thermal cutting means. The cutting means may be, for example a laser processing machine, which is known in the art and therefore not shown in FIG. 1. FIG. 1 shows a workpiece on which several separating cuts were already performed by the laser cutting means, such that several finished parts 2*a*, 2*b*, 2*c*, and 2*d* and a residual part 3 were produced. The residual part 3 is not necessarily waste.

The workpiece support 1 works with a first support level 4 and a second support level 5 such that the finished parts 2*a*, 2*b*, 2*c*, and 2*d* are at a raised position compared to the residual part after cutting. The separated residual part 3 is in the lower support level 5.

The separated parts 2*a*, 2*b*, 2*c*, and 2*d*, and 3 can be easily removed from the laser processing machine because the parts 2*a*, 2*b*, 2*c*, and 2*d* are spatially separated from part 3 and/or caking of the parts 2*a*, 2*b*, 2*c*, and 2*d* was prevented. The arrangement of the finished parts 2a, 2b, 2c, and 2d, and the residual part 3 in two different support levels 4 and 5 after cutting permits automated process-safe removal of the finished parts 2a through 2d and of the residual part 3 from the workpiece support 1. It is clear that association of the support levels 4 and 5 to the finished parts 2a, 2b, 2c, and 2d and the residual part 3 can also be reversed. Removal of the finished parts 2a, 2b, 2c, and 2d and the residual part 3 can be achieved manually or by means of suction cups (vacuum frame).

Figure 2:
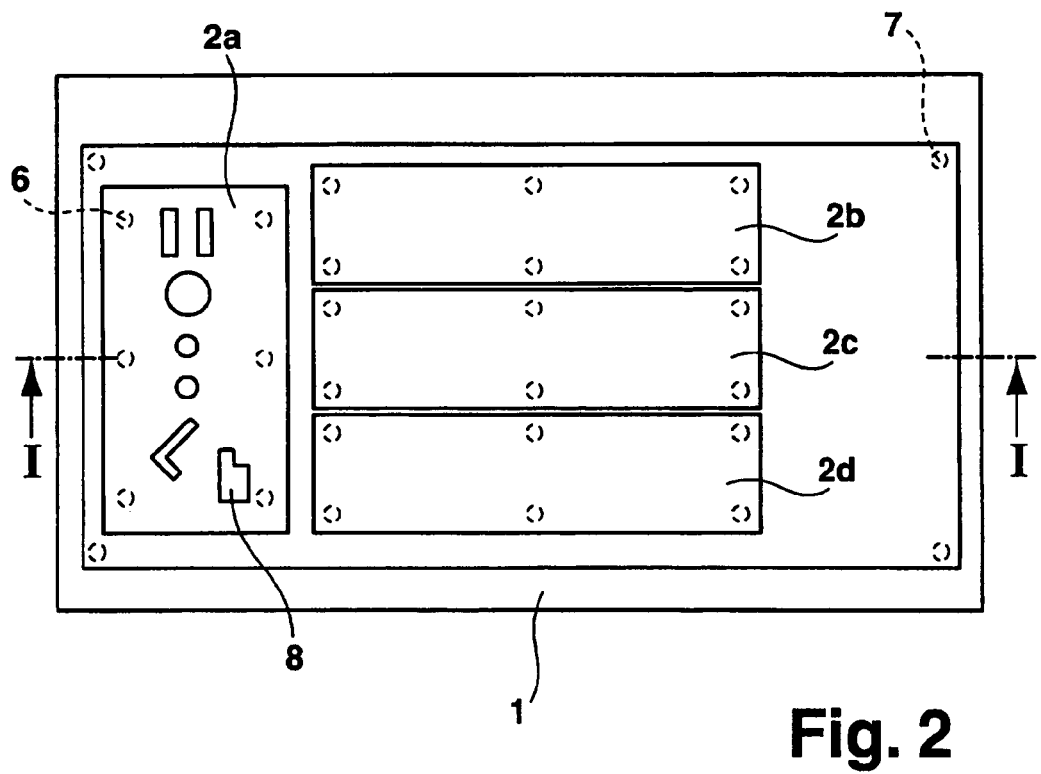
FIG. 2 is a top view onto the workpiece support of FIG. 1.

The cutting process which leads to the situation shown concerns substantially the following method steps which must be carried out one after the other: initially, the workpiece to be cut is supplied to the workpiece support 1. This is achieved manually or with a known transport means. The workpiece to be cut is subsequently supported only on the first support elements 6. The first support elements 6 can be positioned precisely in three dimensions (height/depth; X, Y direction) such that merely the later produced finished parts 2a, 2b, 2c, and 2d are supported or borne by the first support elements 6. For sufficiently uniform support of the produced finished parts 2a, 2b, 2c, and 2d, a sufficient number of first support elements 6 must be provided (possibly in a grid or matrix arrangement, as shown in FIG. 2). The first support elements 6 of the matrix arrangement which can be selected and variably used can be positioned in a defined manner with regard to the finished parts 2a, 2b, 2c, and 2d to be produced for uniform support by means of a programmable control unit. The first support elements 6 are specifically used at that location where later finished parts 2a, 2b, 2c, and 2d are produced.

For later support of the residual part 3 produced after the separating cut, second support elements 7 are provided, of which only individual ones are shown in FIG. 2. The residual part 3 to be separated is not supported or borne during the separating cut and can therefore drop onto the second support elements 7 (support level 5) as separate residual part 3. The second support elements 7 also may be designed to be adjustable in height and suitable for positioning in the X and Y directions.

The separating cut of the cutting process divides the workpiece located at one support level into parts 2a, 2b, 2c, and 2d and 3 located at two support levels. The positions of the first support elements 6 and the second support elements 7 are selected such that these have a separation from the separating cut to be performed in order to produce a free kerf between the finished parts 2a, 2b, 2c, and 2d and the residual part 3. Thermal cutting of the workpiece cannot produce caking or welding of the finished parts 2a, 2b, 2c, and d or the residual part 3 at the support points of the support elements 6 and 7 because processing of the workpiece always takes place above a free space between the support points. The support elements 6 and 7 can be adjusted to different predetermined regions of the workpiece.

The cut finished parts 2a, 2b, 2c, and 2d and the residual part 3 represent free cut material, which is loosely supported on the support elements 6 and 7. The separated finished parts 2a, 2b, 2c, and 2d are supported on the free ends of the first support elements 6, whereas the separated residual part 3 is located at the free ends of the second support elements 7. The support elements 6 and 7 are formed e.g. by bolts or bars. Alternatively, also pneumatically displaceable cylinders can be used. Rollers may additionally be inserted into the support tips on which the finished parts 2a, 2b, 2c, and 2d and the residual part 3 are movably supported.

FIG. 2 moreover shows that also smaller areas 8 are cut out of the finished part 2a, which are also automatically lowered to the deeper support level 5 after the separating cut. To remove the residual part 3, it can possibly be cut before removal.

OTHER EMBODIMENTS

A number of embodiments of the invention have been described. Nevertheless, it will be understood that various modifications may be made. Accordingly, other embodiments are within the scope of the following claims.

What is claimed is:

1. An apparatus for thermal cutting a workpiece comprising:
    a thermal cutting machine that in operation cuts the workpiece into a finished part and a residual part;
    a plurality of adjustable first support elements for supporting the finished part at a first support level;
    a plurality of adjustable second support elements for supporting the residual part at a second support level different from the first support level,
    the first support elements and second support elements being positioned relative to the thermal cutting machine to support selected areas of the workpiece during a cutting operation, and
    a programmable control unit for positioning the support elements,
    wherein the control unit is configured to selectively adjust one or more of said support elements, located under a region of the workpiece whose temperature rises substantially when thermally cut during the cutting operation, to a position where the selected support element(s) do not support the region of the workpiece and configured to selectively adjust the first support elements to the first support level and the second support elements to the second support level before or during operation of the thermal cutting machine.

2. The apparatus of claim 1, wherein the plurality of support elements are displaceable.

3. The apparatus of claim 1, wherein the first support elements are adjustable in height.

4. The apparatus of claim 1, wherein the second support elements are adjustable in height.

5. The apparatus of claim 1, wherein a first matrix of first support elements matching an area of the finished part are selectable from the plurality of adjustable support elements for supporting the finished part and a second matrix of second support elements matching an area of the residual part are selectable from the plurality of adjustable support elements for supporting the residual part.

6. The apparatus of claim 1, wherein a support element comprises a roller at a tip of the support element.

7. The apparatus of claim 1, wherein at least one of the support elements includes a hydraulically displaceable cylinder.

8. The apparatus of claim 1, wherein at least one of the support elements includes a pneumatically displaceable cylinder.

* * * * *